United States Patent
Zemany et al.

(10) Patent No.: US 7,460,053 B2
(45) Date of Patent: Dec. 2, 2008

(54) METHOD AND APPARATUS FOR THROUGH-THE-WALL MOTION DETECTION USING CW RADAR

(75) Inventors: Paul D. Zemany, Amherst, NH (US); Eldon M. Sutphin, Merrimack, NH (US)

(73) Assignee: BAE Systems Information and Electronic Systems Integation Inc., Nashua, NH (US)

( * ) Notice: Subject to any disclaimer, the term of this patent is extended or adjusted under 35 U.S.C. 154(b) by 23 days.

(21) Appl. No.: 10/589,473

(22) PCT Filed: Sep. 14, 2004

(86) PCT No.: PCT/US2004/030116
§ 371 (c)(1),
(2), (4) Date: Aug. 14, 2006

(87) PCT Pub. No.: WO2005/081682

PCT Pub. Date: Sep. 9, 2005

(65) Prior Publication Data
US 2007/0024488 A1    Feb. 1, 2007

Related U.S. Application Data

(60) Provisional application No. 60/537,868, filed on Jan. 20, 2004.

(51) Int. Cl.
*G01S 13/04* (2006.01)
*G01S 13/58* (2006.01)
*G01S 13/62* (2006.01)

(52) U.S. Cl. .............................. 342/22; 342/27; 342/28
(58) Field of Classification Search .................. 342/22, 342/27, 28
See application file for complete search history.

(56) References Cited

U.S. PATENT DOCUMENTS

| | | | |
|---|---|---|---|
| 3,691,558 A | | 9/1972 | Hoard et al. |
| 5,196,826 A | | 3/1993 | Whiting |
| 5,345,240 A | | 9/1994 | Frazier |
| 5,446,461 A | * | 8/1995 | Frazier ................. 342/22 |
| 5,790,032 A | * | 8/1998 | Schmidt ................ 342/28 |
| 6,313,643 B1 | * | 11/2001 | Tirkel et al. ........... 342/28 |
| 6,650,276 B2 | | 11/2003 | Lawless |
| 2007/0024488 A1 | * | 2/2007 | Zemany et al. ........ 342/22 |

FOREIGN PATENT DOCUMENTS

GB    1 450 236    9/1976

* cited by examiner

*Primary Examiner*—Dan Pihulic
(74) *Attorney, Agent, or Firm*—Daniel J. Long; Robert K. Tendler

(57) ABSTRACT

A CW radar (10) is used to detect motion of objects (22) behind a wall (20) by projecting a radar beam through the wall and by measuring the returns from the objects behind the wall, with a change in the phase difference between the transmitted and received CW signals providing an indication of motion behind the wall and thus the presence of an individual.

19 Claims, 2 Drawing Sheets

METHOD AND APPARATUS FOR THROUGH-THE-WALL MOTION DETECTION USING CW RADAR

RELATED APPLICATIONS

This application claims rights under 35 USC 119(e) from U.S. application Ser. No. 60/537,868 filed Jan. 20, 2004, the contents of which are incorporated herein by reference.

FIELD OF THE INVENTION

This invention relates to through-the-wall sensors and more particularly to the use of CW radar to detect motion of objects behind a wall.

BACKGROUND OF THE INVENTION

Oftentimes it is desirable to be able to detect individuals within, for instance, a burning building or enemy combatants or troops behind a wall. Moreover, in some instances police can utilize through-wall sensing systems to be able to detect the presence of wanted individuals from a position outside the building.

Through-wall sensing can be used in military operations in urban terrain, for homeland security, for law enforcement and for fire departments. The need to sense behind walls is clear. It will be appreciated that the details of the mission and types of walls or obstructions dictate the design of the through-wall sensors.

In the past, ultra-wideband devices have been used as ground penetrating and through-the-wall radars. The difficulty with ultra-wideband approaches is that one has to generate short pulses which requires fairly expensive hardware. A particular difficulty with ultra wide band is that walls have frequency dependent attenuation. This results in a distortion of the return pulses that pass through the wall. This distortion blurs the pulse making it hard to correlate. Moreover, in ultra-wideband applications one must integrate over multiple pulses in order to obtain enough processing gain to detect objects inside a building. In this regard, in ultra-wideband systems, one has to generate a stream of pulses. The problem with generating streams of pulses is the existence of clutter and with an ultra-wideband pulsed radar, one detects everything within a room. One therefore has to have a means for discriminating clutter from background, which ultra-wideband systems do not do.

What is therefore required is an easily portable, low cost, low power drain, compact unit that can be positioned outside a building that can detect motion of individuals within the building and discriminate against inanimate objects.

SUMMARY OF INVENTION

In order to obtain a through-the-wall motion detector capable of easily detecting a person within a room, is has been found that one can detect these individuals because they are typically in motion. In order to detect individuals behind a wall, the subject invention employs a simple CW radar with a directional antenna. In one embodiment, the transmitter for this CW radar employs a circulator, which is coupled to a directional antenna so that a CW beam is projected through the wall and into the room. Returns from the CW beam arrive at the same antenna and are split off by the circulator. A reduced power replica from the transmitted signal is mixed with the returns from the antenna. Changes in the phase difference between the two signals indicate motion, and thus the presence of an individual behind the wall. In one embodiment, the summing is performed at a mixer, with slight phase differences indicating motion of an object behind a wall. Thus, if there is anything behind the wall that is moving, and recognizing that people normally move, the system will detect them.

In one embodiment, the CW radar transmitter includes a frequency source coupled to a power divider, with one output of the power divider coupled to the circulator and thence to the directional antenna, which may either be a YAGI or may be a planar antenna having plates spaced from a ground plane.

The power divider output is also supplied to the aforementioned mixer that mixes the output signal with radiation returned from behind the wall, with the motion detection including sampling the signal representing the phase difference and applying an adaptive threshold which, when the change in phase difference exceeds a predetermined threshold, the presence of an individual is indicated. Thus if the phase difference change is greater than a predetermined threshold, the presence of an individual is declared. In one embodiment the detection threshold is adaptively determined by a microprocessor and is then used by the microprocessor to declare detections.

The subject system can be made portable and battery powered and can be transported by fire, police, military troops or other individuals conducting a search of a premises. Within seconds one can ascertain whether individuals are within the premises due to the normal motion of the individuals in a room or along a hallway.

It has been found that the phase difference is periodic when the object behind the wall has a constant motion, as when an individual is walking at a constant rate of speed, or is more random when the speed of the object is not constant. In either case, the change in the phase difference between the transmitted signal and the received signal being above a given threshold can be used to trigger an alarm to indicate the presence of an individual or at least some object that is moving.

Thus, in the case of a fire when one does not want to enter a burning building unnecessarily, one can position one or more of these CW radars adjacent the building to see if there are victims that need rescuing. Likewise, when chasing felons, police may provide such a unit adjacent the outer wall of a building to be able to ascertain if the felon was within the premises.

It will be appreciated that what has been described in one embodiment is a single-frequency CW radar in which a change in the phase difference between the transmitted and received signal is used to indicate the presence of an object in motion behind a wall. It has been found that the system operates irrespective of the type of wall material so that no adjustment need be made based on the type of wall encountered. Moreover, the system automatically discriminates against objects within the room that are stationary, usually inanimate objects. Thus, unlike ultra-wideband radars, the system does not pick up stationary objects such as furniture and the like.

While some frequencies are better than others for wall penetration, it has been found that a signal in the 900 MHz band is optimal for detecting motion behind most walls. However, systems using higher frequencies are effective for longer standoff ranges through lower density walls and lower frequency units are indicated for more dense walls.

In summary, a CW radar is used to detect motion of objects behind a wall by projecting a radar beam through the wall and by measuring the returns from objects behind the wall, with a change in the phase difference between the transmitted and the received CW signals providing an indication of motion behind the wall and thus the presence of an individual. The system may use a microprocessor to set the threshold and declare detections.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
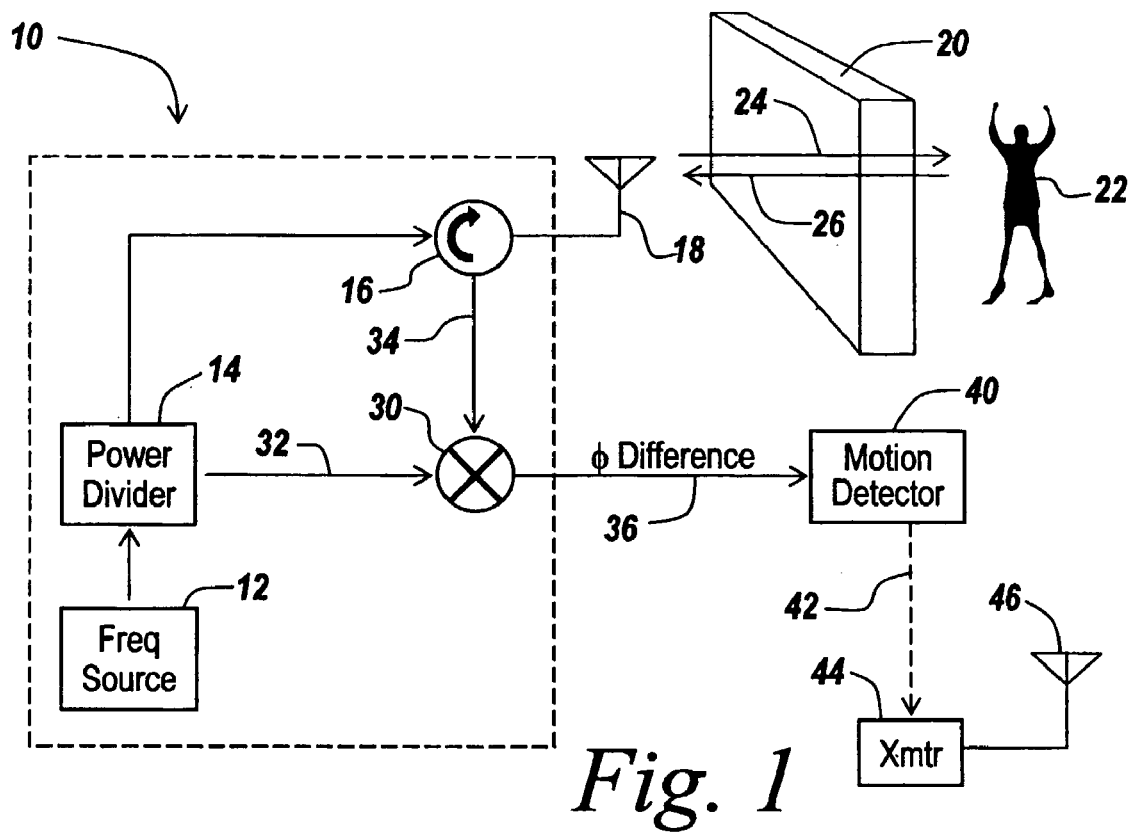
FIG. 1 is a diagrammatic illustration of a single-frequency CW radar having a frequency source, a power divider, a circulator and a mixer, with the circulator being coupled to a directional antenna that directs the CW radar beam into a building and in which a change in the phase difference between returns and the transmitted signal is measured to indicate the presence of an individual behind the wall.

Referring now to FIG. 1, a CW radar 10 includes a frequency source 12, a power divider 14 and a circulator 16 coupled to an antenna 18. Preferably, the antenna is a directional antenna so as to project all of the energy in a given direction, in this case through a wall 20, so as to be able to ascertain whether an individual 22 exists behind the wall.

In one embodiment, the radar is a single frequency radar set optimally in one embodiment to 900 MHz, with antenna 18 in one embodiment being a YAGI antenna, with 13 dB forward gain. While a YAGI antenna may be utilized in order to reduce back lobes and yet have a readily portable unit, a flat panel antenna with conductive elements insulated from a ground plane may be used to eliminate back lobes and is lighter and more easily transportable.

As illustrated, one output of power divider 14 is coupled to circulator 16 coupled to a directional antenna 18 that forms a CW beam as illustrated at 24 which penetrates wall 20. Energy reflected by objects behind the wall as illustrated at 26 is detected by antenna 18 is coupled to circulator 16 and thence to a mixer 30, to which is coupled a divided-down sample of the output of frequency source 12. The result is that power divider 14 divides the power of frequency source 12 to provide a phase reference signal to the mixer. Mixer 30 therefore mixes signals on lines 32 and 34 to derive a phase difference or Doppler transmitted on line 36 to a motion detector 40.

It is the function of motion detector 40 to ascertain when a change in phase difference on line 36 exceeds a predetermined threshold. When this occurs, a moving object behind wall 20 is indicated. Motion detector 40 may have a local alarm or display screen, whereas, as indicated by dotted line 42, the output of motion detector 40 may be transmitted by a transmitter 44 via an antenna 46 to a remote location. In one embodiment, the same RF hardware used by the radar is used to also send the detection report to a remote location. This simplifies the design of the system. In another embodiment, the an independent RF transmitter is used to send the detection report.

In this manner, the unit may be set up, for instance, on a tripod near the exterior wall of a building, with the results of the motion detection being detected at a distance from the building, either to protect troops or police from hostile action or to protect monitoring individuals from, for instance, the heat of a fire.

Figure 2:
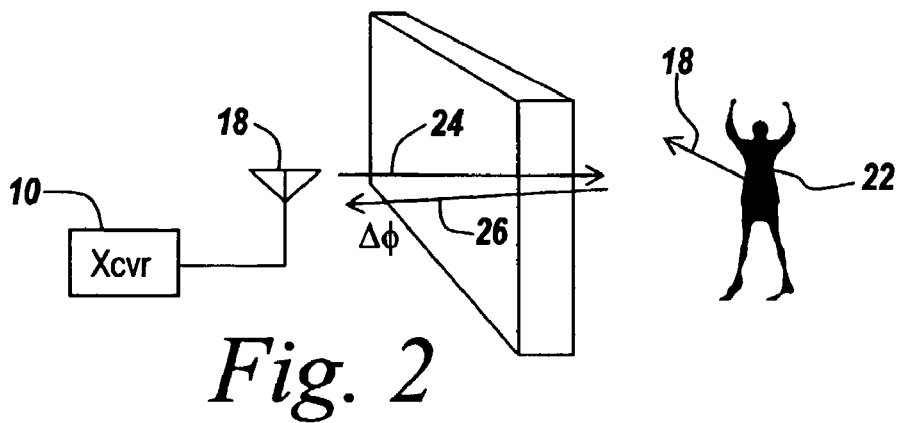
FIG. 2 is a diagrammatic illustration of the system of FIG. 1 indicating a change in phase difference when the individual behind the wall is moving.

As illustrated in FIG. 2, the CW radar 10 projects beam 24 from antenna 18 such that, if individual 22 is moving as illustrated by arrow 48, there is a change in phase difference between beam 24 and returned radiation 26.

Figure 3:
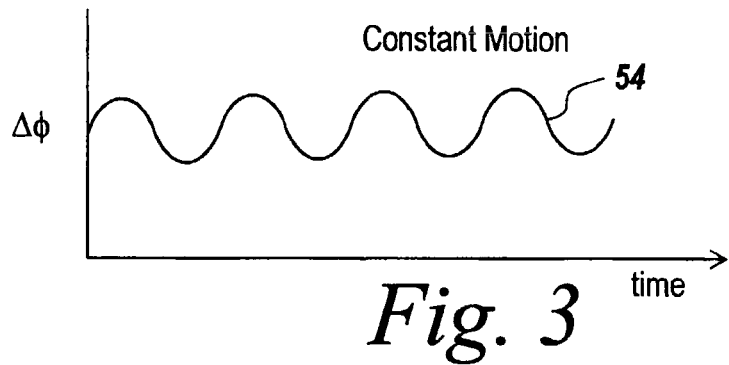
FIG. 3 is a graph showing a periodic waveform of the change in phase difference versus time for constant motion.

As illustrated in FIG. 3, for constant motion, when the phase difference change is graphed against time, there is a sinusoidal waveform 54 that results.

Figure 4:
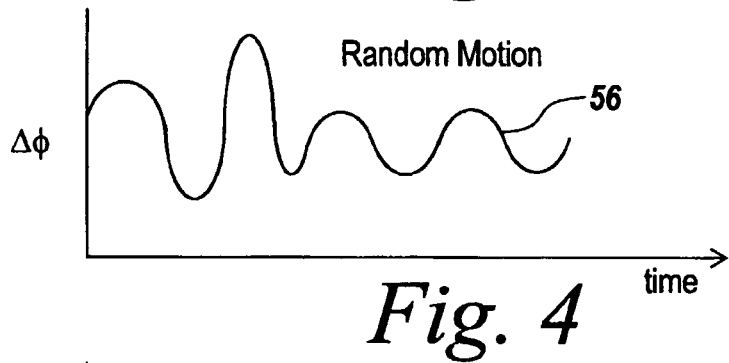
FIG. 4 is a graph of change of phase difference versus time for random motion.
Figure 5:
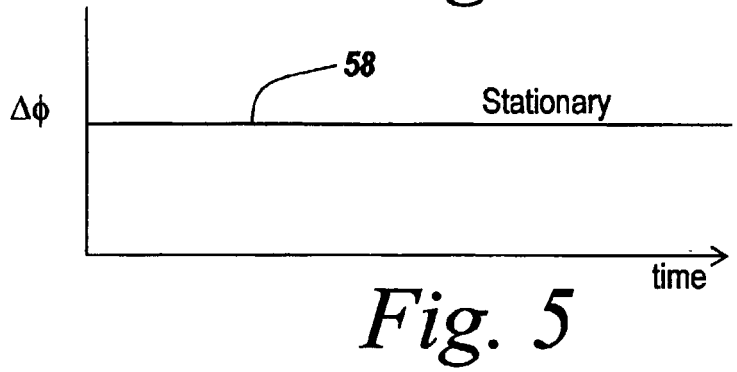
FIG. 5 is a graph showing change of phase difference versus time for a stationary object, indicating a straight line on the graph; and, FIG. 6 is a block diagram of a microprocessor capable of being used in the system of FIG. 1 as a motion detector, with the microprocessor including sampling the phase difference signal and providing the output that is used to set an adaptive threshold which is then used to monitor the signal motion detection.

As illustrated in FIG. 4, if there is random motion of the object behind the wall, then the graph of the phase difference change versus time results in a random curve 56, whereas as illustrated in FIG. 5, if the object is stationary, then the phase difference change versus time is flat as illustrated by straight line 58.

Figure 6:
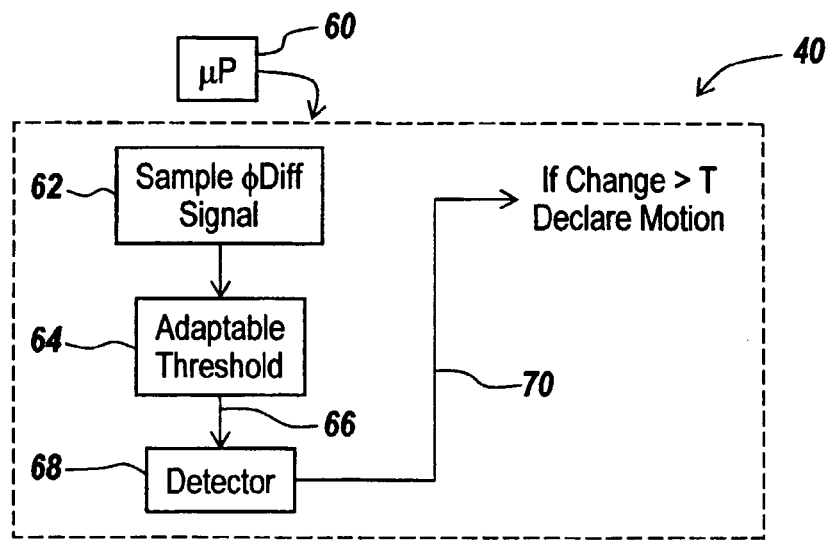

Referring now to FIG. 6, in one embodiment, motion detector 40 may include a microprocessor 60, which includes as part thereof a sampling circuit that samples and holds the phase-difference signal as illustrated at 62. Changes in the sampled phase difference are calculated and applied to an adaptive threshold unit 64, which outputs a signal on line 66 to a detector 68 that provides a signal when the phase difference change is greater than a threshold T set by adaptable threshold unit 64. When there is a signal on line 70 one can declare that motion has occurred and that there is an individual behind the wall.

What has therefore been provided is an extremely simple system for detecting the presence of an individual behind a wall, which uses a CW radar signal and a unit for detecting a change in the difference in phase between the outgoing transmitted CW signal and the reflected CW signal.

It has been found that this is a very sensitive detector of motion and one for which it is not necessary to integrate pulses or, for instance, to sweep the frequency such as is the case in ultra-wideband applications.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for detecting the presence of an individual behind a wail, comprising the steps of:
  projecting CW radar signal through a wall;
  detecting portions of the CW radar signal returned by an object behind the wall;
  determining the phase difference between projected and returned CW radar signals to generate a phase difference signal;
  sampling the phase difference signal;
  thresholding the sampled signal; and, detecting when the sampled signal exceeds the threshold, thus to indicate the presence of a moving individual, whereby individuals moving behind the wall can be detected.

2. The method of claim 1, wherein the frequency of the projected signal is constant.

3. The method of claim 2, wherein the frequency is in a 900 MHz band.

4. The method of claim 1, wherein the threshold is an adaptive threshold.

5. The method of claim 1, and further including the step of determining the location of a moving individual behind the wall from peaks in a graph of phase difference versus distance.

6. Apparatus for the detection of a moving individual behind a wall, comprising:
   a frequency source;
   a power divider coupled to said frequency source for outputting as a first output a CW signal of one predetermined magnitude for forming a radar beam and for outputting as a second output a CW signal of a diminished magnitude;
   a circulator coupled to said first output;
   an antenna coupled to said circulator for transmitting a CW radar beam towards said wall and for detecting radar returns from objects behind said wall;
   a mixer coupled to said second output and said circulator for deriving a phase difference signal representing the phase difference between transmitted and returned signals at said antenna;
   a sampling circuit for sampling the said phase difference signal;
   a thresholding circuit for thresholding said sampled signal;
   a detector for detecting when said sampled signal exceeds said threshold, thus to indicate the presence of a moving object behind said wall; and,
   a transmitter for transmitting the fact of the detection of a moving object to a remote location.

7. The apparatus of claim 6, wherein said detector includes a processor for sampling the output of said mixer, a threshold detector for ascertaining when said change in phase difference of the output of said mixer exceeds an adaptive threshold, and a motion indicator responsive to the output of said threshold detector for the presence of a moving object behind said wall.

8. The apparatus of claim 7, wherein the frequency of said transmitted signal is constant, thus to provide a single-frequency CW radar.

9. The apparatus of claim 8, wherein said single frequency is in a 900 MHz band.

10. The apparatus of claim 6, wherein said detector includes a threshold detector having an adaptive threshold detector.

11. The apparatus of claim 6, wherein said detector detects a moving object behind said wall based on a change in the phase difference between the transmitted and returned signals.

12. The apparatus of claim 11, wherein said phase difference is sensed as a change in a graph of phase difference versus time.

13. The apparatus of claim 6, wherein said antenna is a directional antenna having minimal back lobes to prevent any motion behind said antenna from affecting said phase difference.

14. The apparatus of claim 13, wherein said antenna is a YAGI antenna.

15. The apparatus of claim 13, wherein said antenna is a planar antenna having conductive elements spaced from a ground plane.

16. A system of determining the presence of an individual behind a wall, comprising:
   a CW radar having a directional antenna adapted to project CW radar energy through said wall, and detecting returns from objects behind said wall;
   a phase difference detector for detecting when the phase difference between CW energy directed through said wall and energy returned from objects behind said wall exceeds a predetermined threshold indicating the presence of a moving object behind said wall,
   a transmitter for transmitting the fact of threshold exceedance to a remote location.

17. The system of claim 16, wherein said CW radar operates in a 900 MHz band.

18. The system of claim 16, wherein said CW radar is a single-frequency radar, whereby no clutter rejection is necessary and no long integration times are required.

19. The system of claim 16, wherein said directional antenna has minimal back lobes to reject motion behind said antenna so that behind-the-antenna motion is not detected.

* * * * *